United States Patent [19]

Friesner

[11] Patent Number: 5,345,711

[45] Date of Patent: Sep. 13, 1994

[54] TREESHELTER SYSTEM FOR SEEDLINGS, SAPLINGS, AND THE LIKE

[76] Inventor: Todd Friesner, 411 W. Second Street, Perrysburg, Ohio 43551

[21] Appl. No.: 64,824

[22] Filed: May 19, 1993

[51] Int. Cl.$^5$ ............................................. A01G 17/12
[52] U.S. Cl. .......................................... 47/24; 47/30
[58] Field of Search .................... 47/23, 24, 24 T, 25, 47/25 R, 30, 30 OT

[56] References Cited

U.S. PATENT DOCUMENTS

| | | | |
|---|---|---|---|
| 355,282 | 12/1886 | Sutton | 47/30 |
| 361,241 | 4/1887 | Rugg | 47/30 |
| 466,654 | 1/1892 | Clapp | 47/23 |
| 572,133 | 12/1896 | Stephens | 47/23 |
| 770,461 | 9/1904 | Haggerty | 47/23 |
| 933,654 | 9/1909 | Lippincott | 47/23 |
| 4,711,051 | 12/1987 | Fujimoto | 47/30 |
| 4,845,889 | 7/1989 | Taylor | 47/25 |

FOREIGN PATENT DOCUMENTS

| | | | |
|---|---|---|---|
| 1184320 | 7/1959 | France | 47/30 |
| 2621441 | 4/1989 | France | 47/30 |
| 120825 | 11/1938 | Hungary | 47/24 |
| 183604 | 7/1936 | Switzerland | 47/30 |
| 7424 | of 1906 | United Kingdom | 47/30 |
| 149102 | 8/1920 | United Kingdom | 47/30 |

Primary Examiner—Ramon S. Britts
Assistant Examiner—Joanne C. Downs
Attorney, Agent, or Firm—David C. Purdue; John C. Purdue

[57] ABSTRACT

A treeshelter system comprising a unitary treeshelter with integral staking means is disclosed. The treeshelter system may include treeshelter extenders with a lower edge having connector means which cooperate and connect with connector means provided on the upper edge of a unitary treeshelter or on the top edge of another treeshelter extender. The unitary treeshelter comprises a hollow tube, preferably in the form of a truncated cone, open at both ends, and formed of polymeric material. The tube comprises integral staking means consisting of a plurality of rods secured to and supported in a like number of bosses formed integrally with the tube, and spaced substantially evenly around the lower edge of the tube. A unitary treeshelter according to the invention is installed in a single step by positioning it over a seedling and pressing downwardly until the lower end of it is flush with the ground and the rods are securely embedded in the ground. The height of a treeshelter according to the invention can be customized, on site, with no tools, by the use of extenders, thereby eliminating the need for foresters to maintain an inventory of treeshelters of various lengths. The treeshelter system according to the invention gives foresters the ability to extend the length of a treeshelter comprising a treeshelter base or a treeshelter base and extender, while the treeshelter is still installed over a seedling which has grown within the treeshelter to the top of it.

8 Claims, 4 Drawing Sheets

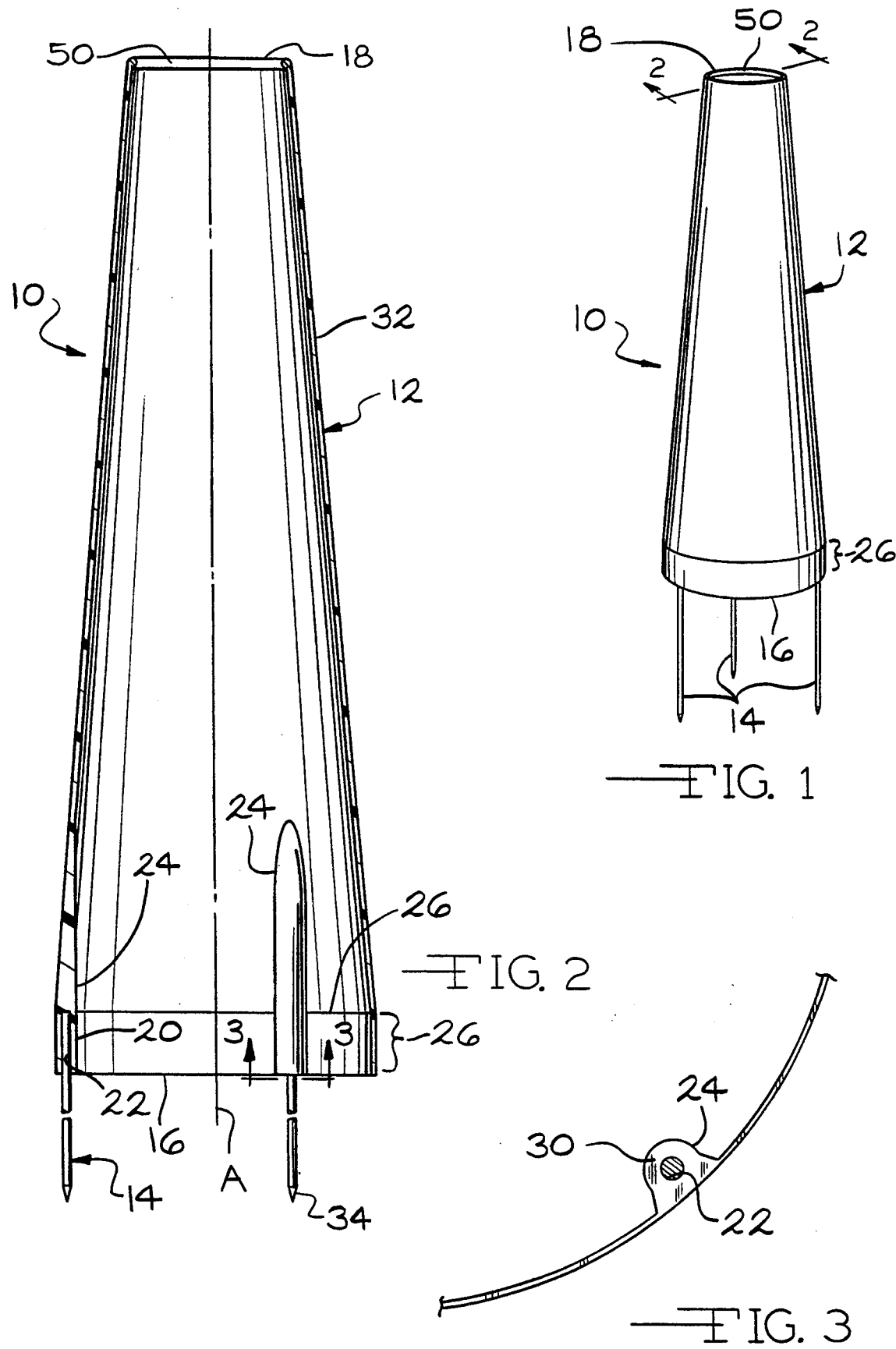

TREESHELTER SYSTEM FOR SEEDLINGS, SAPLINGS, AND THE LIKE

BACKGROUND OF THE INVENTION

1. Field of the Invention.

The present invention relates generally to treeshelters which are devices for covering and protecting seedlings and saplings. More specifically, the invention relates to treeshelter systems comprising a unitary shelter with integral staking means for securing the shelter in the ground surrounding the seedling or sapling. Treeshelters according to the invention are installed in a single step without tools and, once they are installed, they are extremely easy to remove and replace so that the seedling, sapling, or the like may be easily inspected. The removed shelter can be reused.

2. Description of the Prior Art

Treeshelters have long been recognized for their contribution to the growth and well-being of seedlings and saplings. Today, commercial treeshelter systems generally comprise a hollow tube with a circular or polygonal cross section, a separate support stake and connectors for securing the tube to the stake after it is pounded into the ground. Treeshelter systems of this type are thoroughly discussed in "TREESHELTERS", Handbook 7 of the UK Forestry Commission, by M. J. Potter. The U.S. Department of Agriculture and the Forest Service have published Keith Windell's document entitled "Tree Shelters For Seedling Protection" and it also discusses conventional treeshelter systems and their use.

Treeshelters protect young trees from damage due to wind and animals, while providing support for the young trees while they develop adequate root systems. They also enhance the growth rate of seedlings. Although the treeshelters protect seedlings against damage, they still permit sunshine and rain to nourish the seedlings, as well as permitting the application of chemical treatments including fertilizers and pesticides.

U.S. Pat. No. 4,899,486 discloses a conventional treeshelter comprising a twin walled extrusion in a cylindrical form. The patent also discloses that the treeshelter is installed by pounding a separate support stake in the ground, near a newly planted tree (with the risk of damage to the roots of the seedling) and securing the treeshelter to the separate support stake with several ties.

UK Patent application No. 2,212,048A discloses a treeshelter which comprises a separate support stake and a flexible sheet which is formed into a treeshelter shape, i.e., cylindrical, and retained in that shape by collars which include ties for securing the shelter to the support stake.

It is recognized by Potter, Windell and others that the use of these and other conventional multi-component treeshelter systems is very labor intensive and usually involves the use of a sledge hammer or heavy post driver for pounding a separate support stake in the ground. The installation of a treeshelter entails the delivery of the treeshelter components (shelter, separate support stake and ties) to the seedling site, pounding a separate support stake in the ground adjacent the seedling, positioning the shelter over the seedling and connecting the shelter with ties or the like to the separate support stake.

Conventional treeshelter systems are prone to failure in some cases, primarily for reasons involving the conventional, separate support stake. High winds can cause a shelter which is secured to a single, separate support stake to pivot about the stake to the extent that the shelter sheers off a seedling which it was designed to protect. Another failure mode for conventional treeshelters is breakage, usually around a knot, of the separate support stake while it is being pounded into the ground, especially in gravelly or rocky soil. Yet another failure mode involves rotting or degradation of the stake after the treeshelter has been installed. Although the separate support stake can be treated for weather resistance, the chemicals that are used to treat wood contain heavy metals which can leach from the support stake and harm the seedling.

Conventional treeshelters and the separate support stakes are pre-cut to various lengths and this contributes to problems with maintaining inventories of treeshelters and support stakes for various applications.

It is recognized that the growth rate of a seedling in a treeshelter which is taller than the seedling is relatively fast. The growth rate has been observed to decrease, however, when the top of the seedling reaches the top of the treeshelter. Accordingly, it would be advantageous to have a treeshelter system in which the height of a treeshelter could be extended simply and quickly. So far as is known, the height of conventional treeshelters can't be extended. A short conventional treeshelter system can be removed and replaced with a taller one, but that is very cumbersome.

SUMMARY OF THE INVENTION

The present invention is a treeshelter system comprising a unitary treeshelter with integral staking means and may include treeshelter extenders with a lower edge having connector means which cooperate and connect with connector means provided on the upper edge of the unitary treeshelter or on the upper edge of another treeshelter extender. The unitary treeshelter comprises a hollow tube, preferably in the form of a truncated cone, open at both ends, and formed of polymeric material. The tube comprises integral staking means consisting of at least three rods secured to and supported in a like number of bosses formed integrally with the tube, and spaced substantially evenly around the lower edge of the tube. A unitary treeshelter according to the invention is installed in a single step by positioning it over a seedling and pressing downwardly until the lower edge of the treeshelter is flush with the ground and the rods are securely embedded in the ground. Preferably, the upper edge of the unitary treeshelter includes connector means, such as an enlarged lip, which cooperates with connector means on the lower edge of a treeshelter extender, such as a groove, so that the height of a treeshelter according to the invention can be customized, on site, with no tools, thereby eliminating the need for foresters to maintain an inventory of treeshelters and stakes of various lengths. The treeshelter system according to the invention also provides foresters with an opportunity to extend the length of a treeshelter comprising a unitary treeshelter or a unitary treeshelter and extender, while the treeshelter is still installed over a seedling which has grown within the treeshelter to the top of it.

It is therefore a primary object of the present invention to provide a treeshelter system which can be installed over seedlings without tools, without separate support stakes, without ties or connectors and without risk of damage to the seedling.

Another object of the invention is to provide a unitary tree shelter with integral staking means which can be easily installed over a seedling, even when the seedling is planted in rocky or gravelly soil.

Another object of the invention is to provide a treeshelter system in which components can be snap fit together to produce a treeshelter of desired height.

It is a further object of the present invention to provide a treeshelter system in which the height of a treeshelter can be extended while it is installed over a seedling which has grown within the shelter to reach the top of it.

It is a further object of the present invention to provide a treeshelter system which is installed without the need to pound a stake into the ground and without the need for manually connecting the treeshelter to a stake.

It is yet another object of the present invention to provide a treeshelter system which is unitary and thereby eliminates the inventory problems associated with prior art treeshelters as well as the problem of getting the multiple components of conventional treeshelter systems to the site.

It is a further object of the invention to provide a treeshelter system which includes a unitary treeshelter which can accommodate the limb structure of conifers.

It is a further object of the invention to provide a unitary treeshelter which can be infinitely nested with other identical unitary treeshelters, for economical transportation.

Another object of the present invention is to provide a treeshelter system which includes a unitary treeshelter which includes integral staking means.

These and other objects and advantages of the present invention will no doubt become apparent to those skilled in the art after they have read the following detailed description of the preferred embodiment which is illustrated by the various drawing figures.

BRIEF DESCRIPTION OF THE DRAWINGS

FIG. 1 is a perspective view of a unitary treeshelter according to the invention.

FIG. 2 is a cross sectional view of the unitary treeshelter shown in FIG. 1, taken along the line 2—2.

FIG. 3 is a cross sectional view of the unitary treeshelter taken along the line 3—3 in FIG. 2.

DETAILED DESCRIPTION OF THE PREFERRED EMBODIMENT

Figure 5:
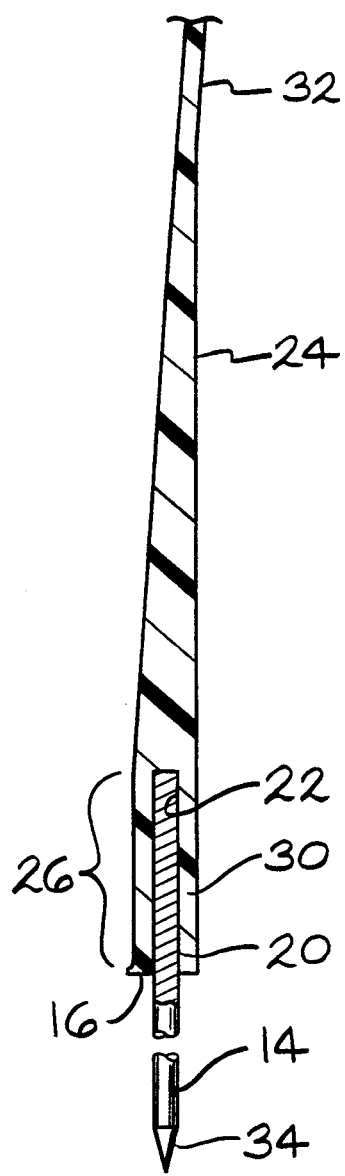
FIG. 5 is a cross sectional view of a boss and rod, taken along the line 5—5 of FIG. 4.

A unitary treeshelter according to the present invention is indicated generally at 10 in FIG. 1. The unitary treeshelter 10 comprises an integral plastic or polymeric treeshelter body 12 and three rods 14 which are connected to the treeshelter body 12 and extend downwardly from a lower edge 16 thereof. The preferred shape of the treeshelter body 12 is illustrated in FIG. 1 and it is a hollow, truncated cone which is open adjacent the lower edge 16 and adjacent an upper edge 18.

Referring now to FIGS. 2 and 3, an upper portion 20 of each of the rods 14 is connected to the unitary treeshelter 10 in bores 22 formed in bosses 24. According to the preferred method for producing the unitary treeshelter 10, the bores 22 are formed in the bosses 24 when the unitary treeshelter 10 is produced, preferably by injection molding. The diameter of the bores 22, when molded, is slightly larger than the diameter of the rods 14. While the injection molded treeshelter body is still warm, the rods are positioned in the bores 22 in the bosses 24 which will have retained the most heat from molding. As the bosses 24 continue to cool, they will contract and engage the rods 14 which will become securely connected to the treeshelter body 12 within the bosses 24. By controlling the size of the bores 22 and the diameters of the rods, this connection will be strong enough to withstand the removal of the unitary treeshelter from the ground by way of a lifting force applied to the treeshelter body 12. Alternatively, the rods may be secured in the bosses by insert molding where the rods are inserted into the body mold and the plastic is injected into the mold in and around the rods. Another alternative is to form the bosses without bores and position the rods against the ends of the bosses and vibrate the rods using sonics so that they form a bore in the boss and heat from friction joins the rod and boss. Injection molding, however, is the preferred method because it facilitates the use of different length rods without the need to change tooling as would be required in the alternative methods discussed above.

It is preferred that three bosses 24 be formed in the body 12 and that they be spaced evenly 120 degrees from each other around the body 12 adjacent to the lower edge 16. Each boss 24 is an integral part of the body 12 and, in the embodiment shown in FIG. 2, the boss extends from the lower edge 16 of the body about six inches towards the upper edge 18. A lower portion 26 of the body 12 constitutes a cylindrical band and the bores 22 in the bosses 24 extend, in a direction which is parallel to the axis A of the body 12, from the lower end 16 of the body 12 to the upper edge 28 of the band 26, preferably about 1 inch (2.5 centimeters). In the preferred embodiment, the body 12 ms injection molded from polypropylene or high density polyethylene and a wall 30 which defines the bore 22 in each boss 24 has a substantially uniform thickness of ⅛ inch (3 millimeters) while the rest of the body comprises a wall 32 with a substantially uniform thickness of 40 thousandths of an inch (1 millimeter), except in the vicinity of the bosses 24. This construction has been found to provide enough rigidity and strength in the bosses 24 and the body 12 so that pushing or pulling forces applied to the body 12 are readily transmitted to the rods 14, even when they are embedded in dirt.

The rods 14 may be made from 9 gauge (4 millimeter diameter) wire and, when the body 12 is produced by injection molding and the rods 14 are inserted in bores in the still hot bosses 24, the diameter of the boss bores 22 would preferably be about 5 thousandths of an inch greater than the diameter of the rods 14. For most applications, it is preferred that the rods have a total length of about 9 inches (23 centimeters) so that the rods 14 extend a distance of about 8 inches (20 centimeters) from the lower end 16 of the body 12. The rods 14 are illustrated as having a point 34 although it is preferred that the rods 14 not be pointed to reduce the likelihood of injury. When the rods 14 are made of 9 gauge wire, unpointed ends of the rods can be pushed into all soils without the use of tools. The rods 14 should be galvanized or otherwise treated to resist corrosion.

In a treeshelter system according to the invention, the unitary treeshelter body 12 may have a nominal height of 2 feet (two thirds of a meter), a diameter at the lower end 16 of 7 and ¾ inches (20 centimeters) and a diameter at the upper end 18 of 4 inches (10 centimeters). The body 12 is formed in the shape of a truncated cone with a large diameter of approximately 8 inches at the lower edge so that it can accommodate conifer branching, although this shape is equally well suited for use on deciduous trees. As noted by Potter in Treeshelters, shelter effect drops off when the diameter of the shelter body increases beyond about 8 inches (20 centimeters). The average diameter of a unitary treeshelter according to the invention is preferably about 6 inches (15 centimeters).

As mentioned previously and by Potter, conventional treeshelters are cut to various lengths anywhere from about 2 feet (2/3 meter) up to about 6 feet (2 meters). Treeshelters of various lengths are produced, according to the treeshelter system of this invention, by assembling modular components of predetermined lengths to achieve a treeshelter of desired length. One such modular component is the unitary treeshelter 10 which has already been described above.

Figure 4:
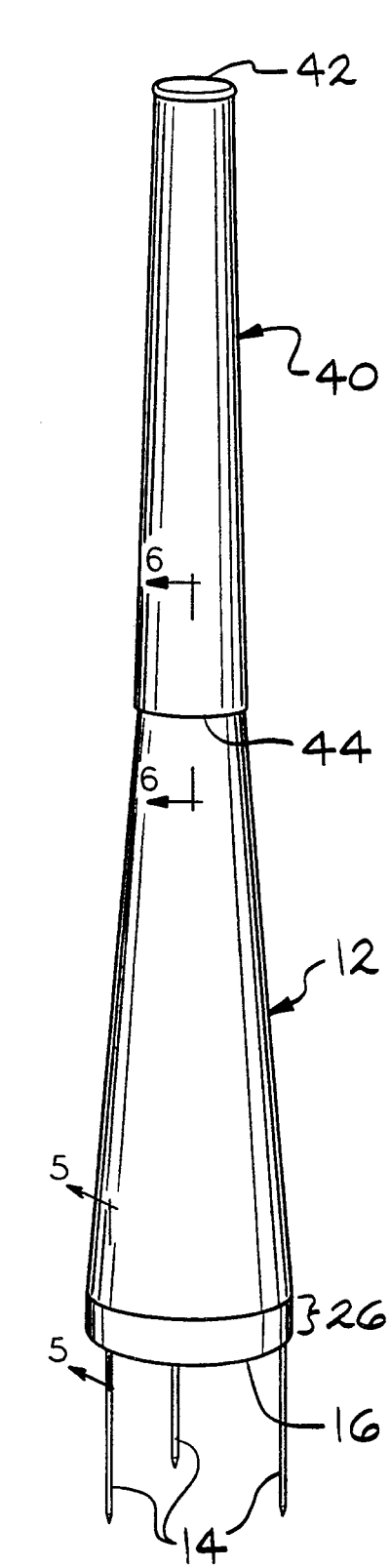
FIG. 4 is a perspective view of a unitary treeshelter with an extender connected to the upper edge of the unitary treeshelter.
Figure 6:
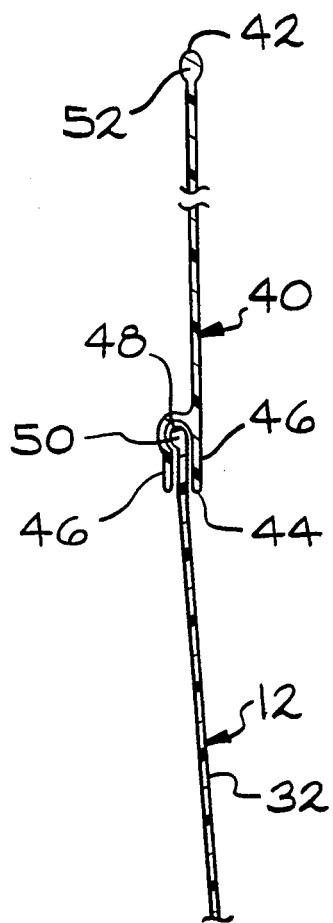
FIG. 6 is a cross sectional view, taken along the line 6—6 of FIG. 4, showing connector means provided on the upper edge of the unitary treeshelter and connector means provided on the lower edge of the extender.

Another modular component is an extender 40. One embodiment of an extender is illustrated in FIGS. 4 and 6 and a second embodiment of an extender is illustrated in FIGS. 7-10. The extender 40 is a hollow tube with an open upper end 42 and an open lower end 44. The lower end 44 of the extender 40 has connector means which comprise a pair of opposed flanges 46 connected by a web 48 which, together, define a groove which extends around the entire lower edge 44 of the extender 40. A lip 50 is formed on the upper edge 18 of the unitary treeshelter 10 and extends all the way around the edge 18. A lip 52 is formed on the upper edge 42 of the treeshelter extender 40 and extends all the way around the edge 42. The unitary treeshelter lip 50 cooperates with the elements forming the groove in the lower edge 44 of the treeshelter extender 40 so that, when the lip 50 is pressed into the groove or vice versa, the treeshelter extender 40 will be firmly connected to the unitary treeshelter 10. Similarly, the lip 52 may be received in a groove formed by elements at the lower edge of yet another extender (not shown) having a lip at its upper edge. Thus, it will be seen that a treeshelter having a height greater than the height of a unitary treeshelter can be produced from a system comprising a unitary treeshelter and a desired number of treeshelter extenders which can be releasably connected to each other to produce a treeshelter of desired height. Although a specific lip and groove arrangement has been disclosed and described for connecting components of the treeshelter system, it will be readily appreciated that other suitable means for connecting these components may be employed to advantage in a system according to the invention.

The extender shown 40 is illustrated in FIG. 4 as having the shape of a hollow truncated cone with a given diameter at the end 42 and a slightly larger diameter at the end 44. This affords a slight draft which facilitates production of the extender by means of injection molding. It will be appreciated that an extender (not shown) may have a cylindrical shape with the same diameter at each end and, in that case, the connector means shown in FIG. 6 may be employed to connect any number of cylindrical extenders. In the case of an extender which is conical, preferred connector means are illustrated in FIGS. 7-10.

Figure 7:
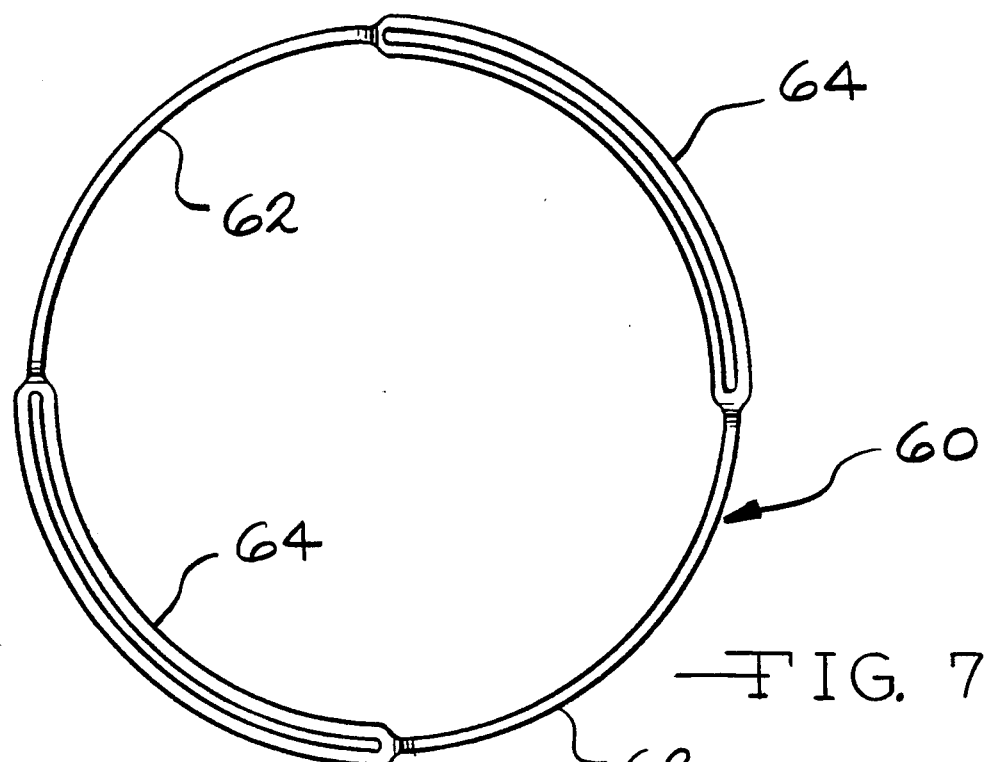
FIG. 7 is plan view of a first end of a second embodiment of a treeshelter extender, showing alternative connector means.
Figure 8:
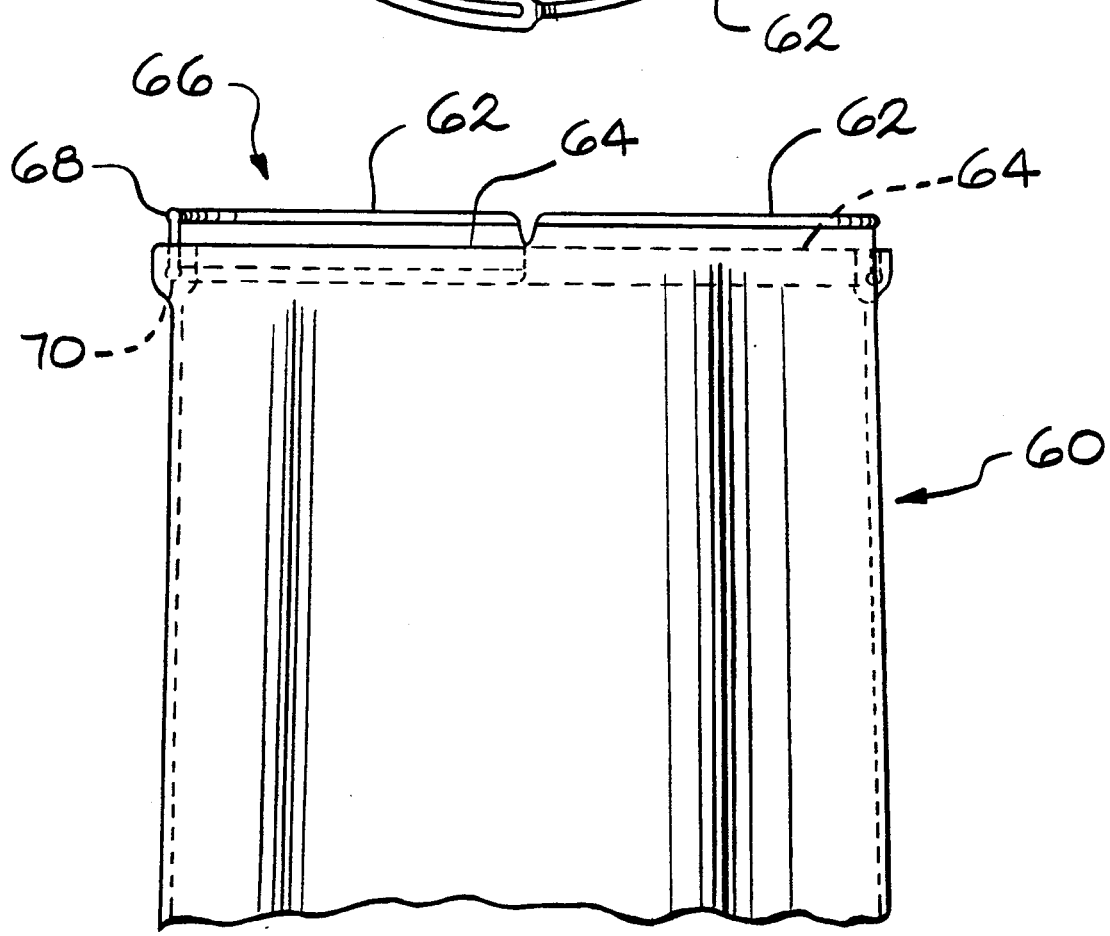
FIG. 8 is a side view of the first end of the treeshelter extender shown in FIG. 7.
Figure 9:
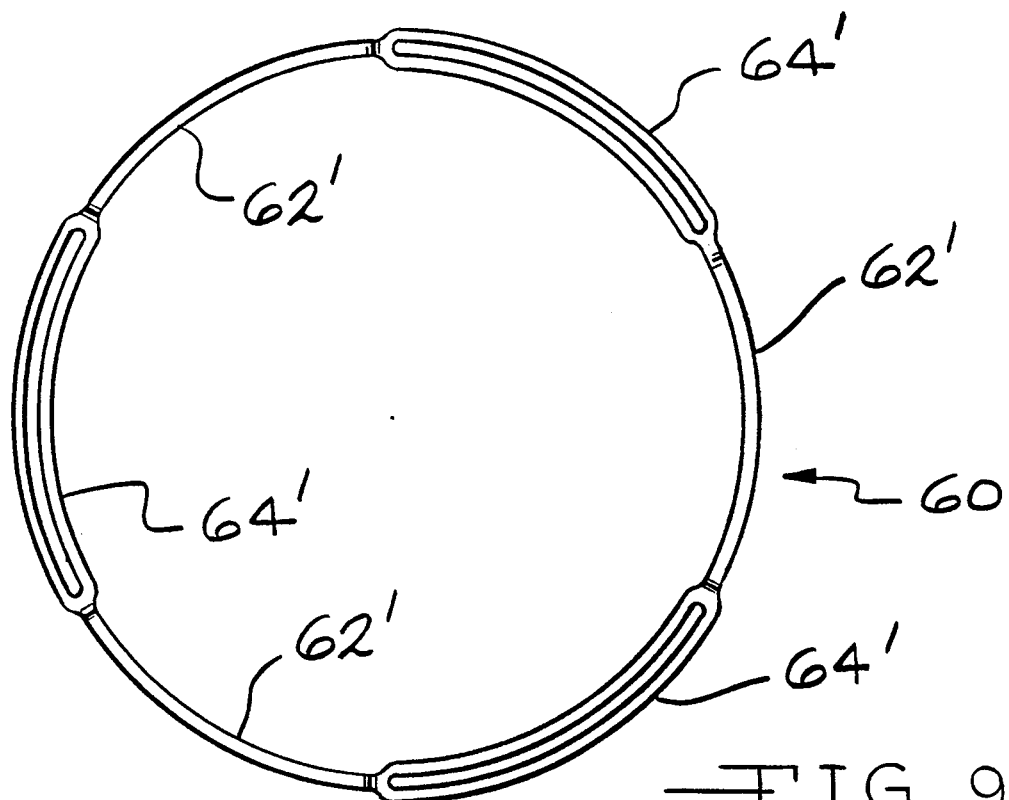
FIG. 9 is plan view of a second end of the second embodiment of a treeshelter extender, showing alternative connector means.
Figure 10:
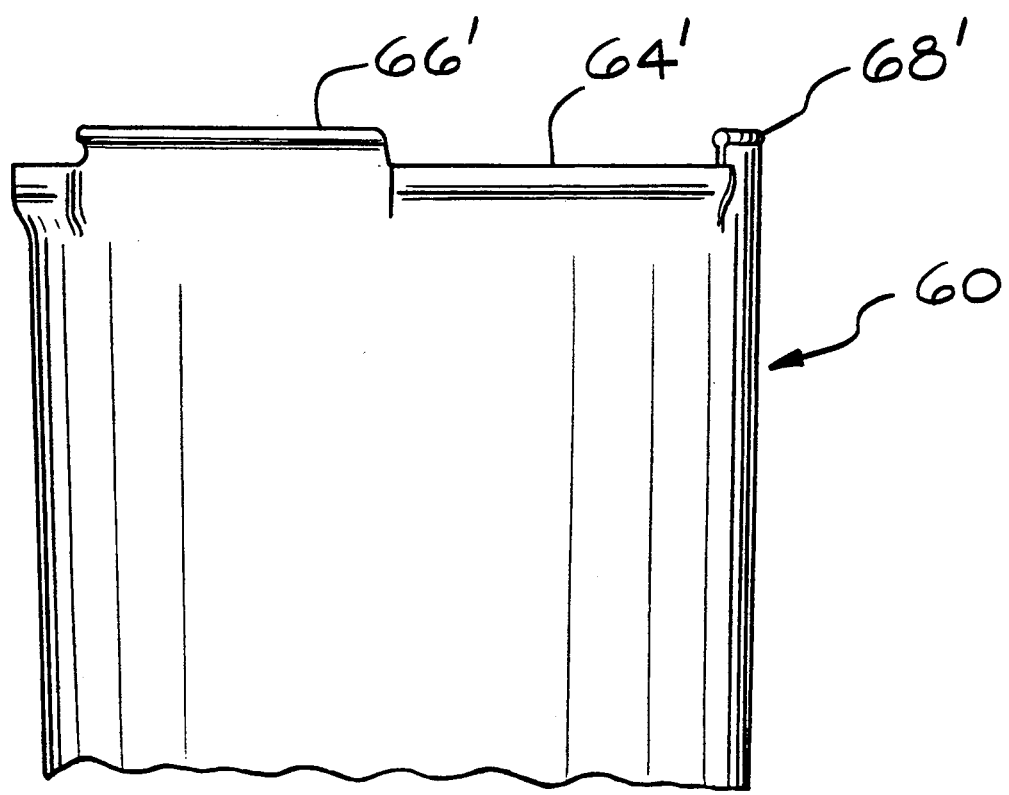
FIG. 10 is a side view of the second end of the treeshelter extender shown in FIG. 9.

Referring now to FIGS. 7-10, alternative connector means are described in connection with an end of either a unitary treeshelter or a treeshelter extender indicated generally at 60. The connector means shown in FIGS. 7 and 8 comprise a pair of tongue sections 62 and a pair of groove sections 64. The tongue and groove sections 62 and 64 are alternatingly distributed around an end 66 of the treeshelter/extender 60 and each constitutes approximately one fourth of the circumference of the treeshelter/extender 60 at the end 66. The tongue sections 62 may have a lip 68 and the groove sections 64 may have a lip configuration, as indicated at 70. Similar connector means are shown in FIGS. 9 and 10 but they comprise three tongue sections 62' and three groove sections 64'. The tongue and groove sections 62' and 64' are alternatingly distributed around an end 66 of the treeshelter/extender 60 and each constitutes approximately one sixth of the circumference of the treeshelter/extender 60 at the end 66. Each tongue section 62' may also have a lip 68' and the groove sections 64' may also have a lip configuration (not shown).

The connector means illustrated either in FIGS. 7 or 8 or in FIGS. 9 and 10 may be used exclusively in a treeshelter system according to the invention, meaning that the upper end of the unitary treeshelter and each end of each extender would have one or the other connector means. It is preferred, however, in the case where the extender is conical and has a first end with a first diameter and a second end with a second, slightly different diameter, that the first end have one type of connector means, such as that shown in FIGS. 7 and 8 and that the second end have a different type of connector, such as that shown in FIGS. 9 and 10, so that the type of connector means may provide a visual indication which will make it easier to connect the end of an extender having a given diameter to the end of another extender or the upper end of a unitary tree shelter having the same given diameter.

Regardless of whether the treeshelter extender has the same connector means at each end or different connector means at each end, any number of treeshelter extenders, whether conical or cylindrical, having connector means corresponding with those illustrated in FIGS. 7-10 can be connected to each other to produce a treeshelter having a desired height. Accordingly, any number of treeshelter extenders, having one configuration, can be used to produce, on site, without tools, a treeshelter of a desired height, completely eliminating the need to maintain inventories of different length treeshelters. Manufacturing costs are also reduced since a single part can be used, in combination with a unitary tree shelter, to extend the height of a unitary treeshelter to any height. In the case of cylindrical treeshelter extenders, this result can be achieved with the connector means shown in FIGS. 4 and 6.

It will be appreciated that connector means corresponding with those shown in FIGS. 7-10 comprise any given number of groove sections and a like number of tongue sections.

It will be appreciated that the unitary treeshelter 10 may be comprised of a unitary treeshelter having a length of, for example, twelve inches and a treeshelter extender having a length of twelve inches. In this case, connector means would be provided to connect the two parts and this would reduce the tooling costs and, specifically, the die costs associated with producing a unitary treeshelter that is twenty four inches tall.

The color of a treeshelter system according to the invention can be controlled to advantage. For example, different colored shelters can be used on different kinds of trees, especially those which require different care, to assist persons who would not otherwise be able to readily differentiate between species of trees.

Although the present invention has been described in terms of specific embodiments, it is anticipated that alterations and modifications thereof will no doubt become apparent to those skilled in the art. It is therefore intended that the following claims be interpreted as covering all such alterations and modifications as fall within the true spirit and scope of the invention.

What is claimed is:

1. A unitary treeshelter in combination with a treeshelter extender having a first end with connector means provided thereon, said treeshelter comprising
    a hollow, unitary treeshelter body having first and second ends and a longitudinally extending axis, said treeshelter body being open at both ends and having a plurality of bosses formed integrally in the treeshelter body adjacent the first end thereof,
    a bore provided in each of said bosses said bores being oriented so that they are substantially parallel to the longitudinal axis of said treeshelter body,
    a rod secured in each bore and extending a given distance beyond the first end of said treeshelter body, and
    connector means provided on the second end of the treeshelter body, wherein said unitary tree shelter may be installed over a seedling planted in the ground by positioning the treeshelter over a seedling and pressing downwardly on the treeshelter body until the lower edge of said treeshelter body is flush with the ground and said rods are firmly embedded in the ground and wherein the length of the treeshelter body can be extended by connecting said connector means provided on said second end of the treeshelter body to the connector means on the first end of the treeshelter extender.

2. The unitary treeshelter claimed in claim 1, wherein said treeshelter body has the shape of a truncated cone and wherein the diameter of the opening at the first end of said treeshelter body is larger than the diameter of the opening at the second end of said treeshelter body.

3. A treeshelter system comprising
    a hollow, unitary treeshelter body having first and second ends and a longitudinally extending axis, said treeshelter body being open at both ends and having a plurality of bosses formed integrally in the treeshelter body adjacent the first end thereof, and having connector means provided at its second end,
    A bore provided in each of said bosses, said bores being oriented so that they are substantially parallel to the longitudinal axis of said treeshelter body, and
    a rod secured in each bore and extending a given distance beyond the first end of said treeshelter body, and
    at least one treeshelter extender comprising a hollow extender body having first and second open ends and wherein said first end of said extender has a diameter corresponding with the diameter of the second end of said treeshelter body and connector means provided at the first end of said extender, wherein said treeshelter body connector means and said extender connector means are operable to connect said treeshelter body and extender.

4. The treeshelter system claimed in claim 3 wherein said extender further comprises connector means provided on said second end thereof, wherein said extender has the shape of a truncated cone and wherein said connector means on said first end of the extender comprise a given number of tongue and groove sections and wherein said connector means on said second end of the extender comprise a number, different than the given number, of tongue and groove sections.

5. A treeshelter extender for extending the length of a treeshelter body having an upper end with a given diameter and connector means provided on the upper end of the treeshelter body, said extender comprising
    a hollow extender body having first and second ends, said first end of said extender having a given diameter corresponding with the diameter of the upper end of said treeshelter body,
    first connector means provided on said first end of said extender for engaging the connector means provided on the treeshelter body, wherein said treeshelter body connector means and said extender connector means are operable to connect said extender body to the treeshelter body and
    second connector means provided on said second end of said extender body for connecting said second end of said extender to a second end of another extender body.

6. The extender claimed in claim 5 wherein said connector means on said first end of said extender body do not cooperate with said connector means on said second end of said extender body.

7. The extender claimed in claim 5 wherein said extender body has the shape of a truncated cone.

8. The extender claimed in claim 7 wherein said connector means on said first end of said extender body do not cooperate with said connector means on said second end of said extender body.

* * * * *